(12) United States Patent
Kassam et al.

(10) Patent No.: US 9,247,183 B2
(45) Date of Patent: Jan. 26, 2016

(54) PROGRAM GUIDE WITH PAST HISTORY DISPLAY AND PROGRAM SELECTION

(75) Inventors: Shafiq Kassam, Lewisville, TX (US); Venkata S. Adimatyam, Irving, TX (US); Anil K. Padi, Irving, TX (US); Sameer V. Gavade, Irving, TX (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 0 days.

(21) Appl. No.: 13/526,891

(22) Filed: Jun. 19, 2012

(65) Prior Publication Data

US 2013/0335637 A1    Dec. 19, 2013

(51) Int. Cl.
| | |
|---|---|
| H04N 21/462 | (2011.01) |
| H04N 5/445 | (2011.01) |
| H04N 21/472 | (2011.01) |
| H04N 21/482 | (2011.01) |
| H04N 21/84 | (2011.01) |

(52) U.S. Cl.
CPC ..... *H04N 5/44543* (2013.01); *H04N 21/47202* (2013.01); *H04N 21/4821* (2013.01); *H04N 21/84* (2013.01); *H04N 2005/44556* (2013.01)

(58) Field of Classification Search
None
See application file for complete search history.

(56) References Cited

U.S. PATENT DOCUMENTS

| | | | | |
|---|---|---|---|---|
| 5,751,282 | A * | 5/1998 | Girard et al. | 715/721 |
| 2002/0174433 | A1* | 11/2002 | Baumgartner et al. | 725/58 |
| 2003/0177495 | A1* | 9/2003 | Needham et al. | 725/55 |
| 2003/0208763 | A1* | 11/2003 | McElhatten | G06F 3/0482 725/58 |
| 2005/0047752 | A1* | 3/2005 | Wood et al. | 386/83 |
| 2005/0097624 | A1* | 5/2005 | Salo et al. | 725/136 |
| 2005/0125828 | A1* | 6/2005 | Fujiwara et al. | 725/60 |
| 2007/0094689 | A1* | 4/2007 | McElhatten et al. | 725/58 |
| 2007/0154163 | A1* | 7/2007 | Cordray | 386/52 |
| 2007/0192793 | A1* | 8/2007 | Song et al. | 725/39 |
| 2007/0300253 | A1* | 12/2007 | Kawai et al. | 725/38 |
| 2008/0244657 | A1* | 10/2008 | Arsenault et al. | 725/48 |
| 2009/0063979 | A1* | 3/2009 | Haber et al. | 715/719 |
| 2009/0100466 | A1* | 4/2009 | Migos | H04N 5/44543 725/40 |
| 2009/0113491 | A1* | 4/2009 | Kuether et al. | 725/67 |
| 2009/0125945 | A1* | 5/2009 | Lee et al. | 725/46 |
| 2009/0241144 | A1* | 9/2009 | Lajoie et al. | 725/40 |
| 2011/0176787 | A1* | 7/2011 | DeCamp | 386/241 |
| 2011/0239249 | A1* | 9/2011 | Murison et al. | 725/39 |
| 2011/0321094 | A1* | 12/2011 | Kuo | G06F 3/0481 725/40 |
| 2013/0114940 | A1* | 5/2013 | Merzon et al. | 386/241 |

* cited by examiner

*Primary Examiner* — Hunter B Lonsberry
*Assistant Examiner* — Cynthia Fogg (57) ABSTRACT

A method includes receiving, at a set top box, an instruction or command from a user to view program listings associated with programs that were broadcast by a television service provider during a first period of time that is prior to a current time. The method also includes identifying at least one television program that was broadcast during the first period of time and that is available to the user, and outputting, by the set top box, a program guide identifying the at least one television program. The method further includes receiving, at the set top box, a selection corresponding to a first one of the at least one television program and outputting, by the set top box, the first television program.

21 Claims, 8 Drawing Sheets

PROGRAM GUIDE WITH PAST HISTORY DISPLAY AND PROGRAM SELECTION

BACKGROUND INFORMATION

Programming guides display programs that are currently being broadcast or programs that will be broadcast in the future. For example, a television service provider may provide an electronic program guide that lists television programs that are currently being broadcast, as well as programs that will be broadcast in the upcoming hours or even upcoming days. The user may interact with the programming guide to select programs to watch and/or record.

DETAILED DESCRIPTION OF PREFERRED EMBODIMENTS

The following detailed description refers to the accompanying drawings. The same reference numbers in different drawings may identify the same or similar elements. Also, the following detailed description does not limit the invention.

Embodiments described herein relate to allowing a user to view programs that were previously broadcast by a service provider. In one exemplary embodiment, a program guide may allow a user to scroll back in time to view program listings associated with programs that were previously broadcast, but are still available for viewing. For example, the programs may be available in an "on demand" mode. In this embodiment, the user may select the program of interest via the program guide and the program is provided to the user without any further input from the user. Programs that were previously broadcast that are no longer available for viewing may not be shown in the program guide to avoid the user selecting a program that is not available for viewing.

Figure 1:
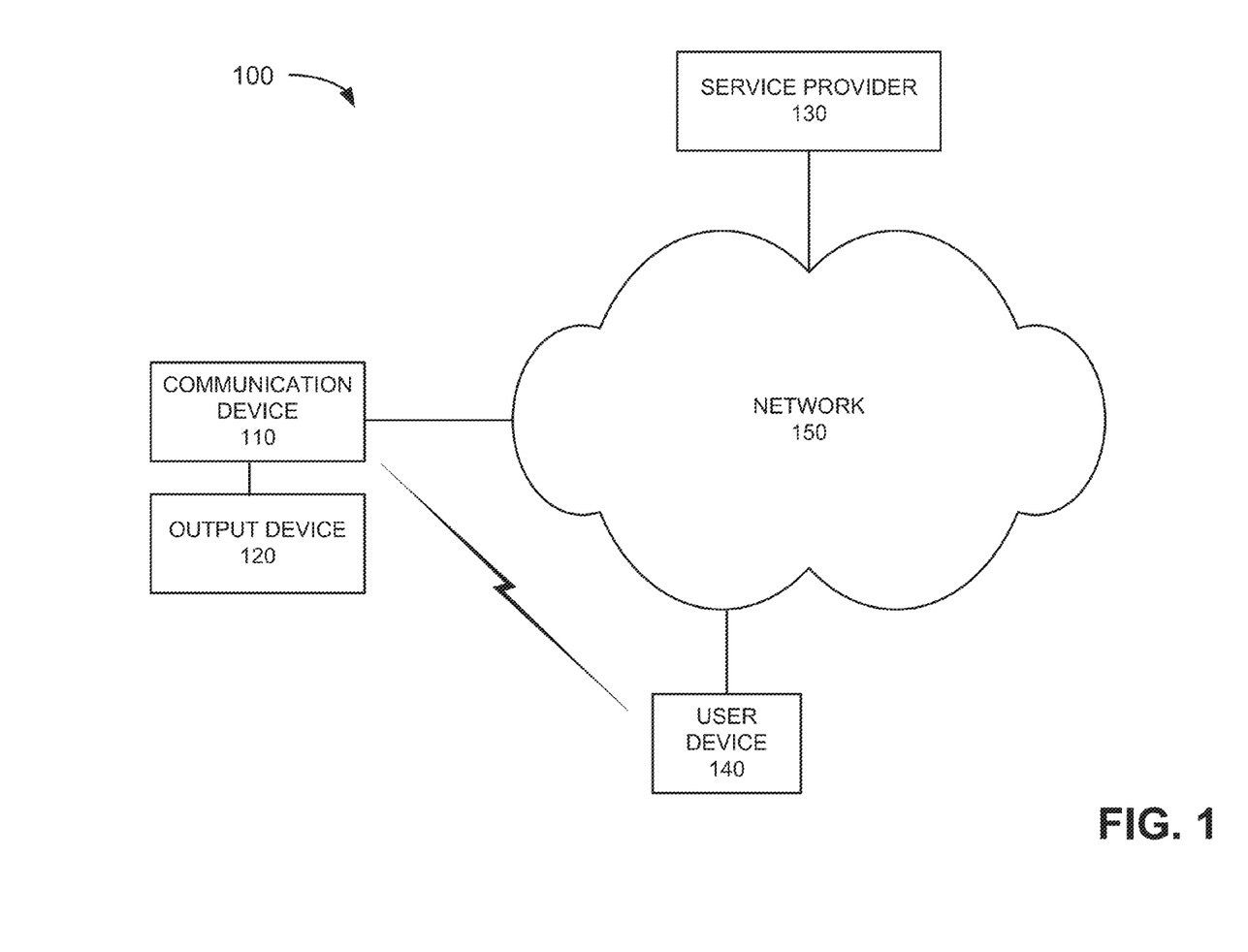
FIG. 1 illustrates an exemplary network in which systems and methods described herein may be implemented.

FIG. 1 is a block diagram of an exemplary network 100 in which systems and methods described herein may be implemented. Network 100 may include communication device 10, output device 120, service provider 130, user device 140 and network 150.

Communication device 110 may include any type of device that is able to receive data, such as text data, video data, image data, audio data, multi-media data, etc., transmitted from a source, such as service provider 130. Communication device 110 may decode the data and output the data to output device 120 for viewing or playing. In an exemplary implementation, communication device 110 may include a set top box used to decode incoming multi-media data, such as multi-media data received from a television service provider, a cable service provider, a satellite system, a wireless system or some other wired, wireless or optical communication medium. The term "set top box" as used herein should be construed to include any device used to receive signals from an external source and output the signals for viewing or playing. In some implementations, communication device 110 may forward the decoded data for viewing or playing by another device, such as output device 120. In other implementations, communication device 110 may play and display the decoded media.

For example, in some implementations, communication device 110 may include some type of computer, such as a personal computer (PC), laptop computer, home theater PC (HTPC), smart television (TV), etc., that is able to receive incoming data and decode the incoming data for output to a display, which may be included with communication device 110. In this instance, communication device 110 may include logic, such as a cable card or other logic, to interface with service provider 130. Communication device 110 may also include a digital video recorder (DVR) or any other recording device configured to record programs provided by service provider 130. The recorded programs may be available for later viewing via output device 120.

Output device 120 may include any device that is able to output/display various media, such as a television, monitor, PC, laptop computer, HTPC, a personal digital assistant (PDA), a web-based appliance, a mobile terminal (e.g., a cellular telephone), etc. In an exemplary implementation, output device 120 may receive multi-media data from communication device 110 and display or play the media.

Service provider 130 may include one or more computing devices, servers and/or backend systems that are able to connect to network 150 and transmit and/or receive information via network 150. In an exemplary implementation, service provider 130 may provide multi-media information, such as television shows, movies, sporting events, podcasts or other media presentations to communication device 110 for output to a user/viewer.

User device 140 may include any device or combination of devices capable of transmitting commands to and/or receiving information from a device, such as communication device 110 or another device/system via a network, such as network 150. In one implementation, user device 140 may include a remote control device that uses infrared (IR) signals or other types of wireless signals to transmit commands and/or input information, such as information associated with recording programs, to communication device 110. Communication device 110 may receive the signals from user device 140 and perform the desired function based on the particular signal/command.

In other implementations, user device 140 may include any type of communication device, such as a voice over Internet protocol (VoIP) telephone (e.g., a session initiation protocol (SIP) telephone), a wireless or cellular telephone device (e.g., a personal communications system (PCS) terminal that may combine a cellular radiotelephone with data processing and data communications capabilities, a PDA that can include a radiotelephone, or the like), etc. In still other implementations, user device 140 may include a PC, laptop computer, tablet computer or other computing device. In such implementations, user device 140 may connect to network 150 and/or communication device 110 via any conventional technique, such as wired, wireless, or optical connections, to transmit commands and/or input information to communication device 110.

Network 150 may include one or more wired, wireless and/or optical networks that are capable of receiving and transmitting data, voice and/or video signals, including multi-media signals that include voice, data and video information. For example, network 150 may include one or more public switched telephone networks (PSTNs) or other type of switched network. Network 150 may also include one or more wireless networks and may include a number of transmission towers for receiving wireless signals and forwarding the wireless signals toward the intended destinations. Network 150 may further include one or more satellite networks, one or more packet switched networks, such as an Internet protocol (IP) based network, a local area network (LAN), a wide area network (WAN), a personal area network (PAN) (e.g., a wireless PAN), an intranet, the Internet, or another type of network that is capable of transmitting data.

The exemplary configuration illustrated in FIG. 1 is provided for simplicity. It should be understood that a typical network may include more or fewer devices than illustrated in FIG. 1. For example, network 100 may include additional elements, such as switches, gateways, routers, backend systems, etc., that aid in routing information, such as media streams from service provider 130 to communication device 110. In addition, although communication device 110, output device 120 and user device 140 are shown as separate devices in FIG. 1, in other implementations, the functions performed by two or more of these devices may be performed by a single device or platform. Alternatively, in other implementations, a recording device associated with recording programming from service provider 130 may be located externally with respect to communication device 10.

Figure 2:
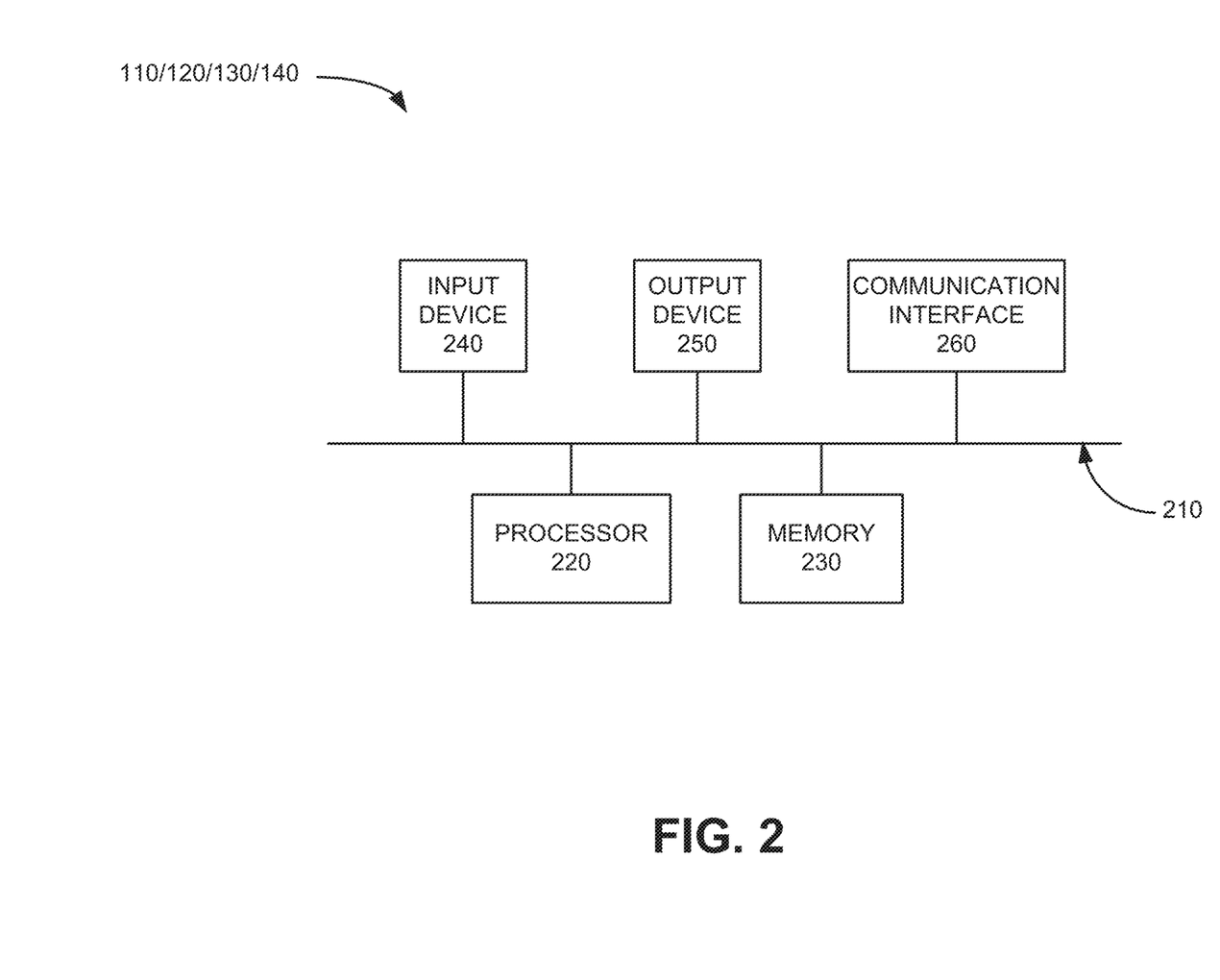
FIG. 2 illustrates an exemplary configuration of the communication device of FIG. 1.

FIG. 2 illustrates an exemplary configuration of communication device 110. Service provider 130, user device 140 and/or output device 120 may be configured in a similar manner. Referring to FIG. 2, communication device 110 may include a bus 210, a processor 220, a memory 230, an input device 240, an output device 250 and a communication interface 260. Bus 210 may include a path that permits communication among the elements of communication device 110.

Processor 220 may include one or more processors, microprocessors, or processing logic that may interpret and execute instructions. Memory 230 may include a random access memory (RAM) or another type of dynamic storage device that may store information and instructions for execution by processor 220. Memory 230 may also include a read only memory (ROM) device or another type of static storage device that may store static information and instructions for use by processor 220. Memory 230 may further include a solid state drive (SDD). Memory 230 may also include a magnetic and/or optical recording medium (e.g., a hard disk) and its corresponding drive. In an exemplary implementation, memory 230 may store programming received from service provider 130, as described in detail below.

Input device 240 may include a mechanism that permits a user to input information to communication device 110, such as a keyboard, a keypad, a mouse, a pen, a microphone, a touch screen, voice recognition and/or biometric mechanisms, etc. Input device 240 may also include mechanisms for receiving input via a remote control device, such as user device 140, which may be a device that sends commands to communication device 110 via IR or radio frequency signals. Output device 250 may include a mechanism that outputs information to the user, including a display, a printer, a speaker, etc.

Communication interface 260 may include a transceiver that communication device 110 may use to communicate with other devices (e.g., output device 120 (FIG. 1) and user device 140) and/or service provider 130. For example, communication interface 260 may include mechanisms for communicating with output device 120, service provider 130 and/or user device 140 via wired, wireless or optical mechanisms. For example, communication interface 260 may output received programming to output device 120. Communication interface 260 may also include one or more radio frequency (RF) transmitters, receivers and/or transceivers and one or more antennas for transmitting and receiving RF data via network 150. Communication interface 260 may further include a wireless interface for communicating with other devices in network 100, such as user device 140. Communication interface 260 may also include a modem or an Ethernet interface to a LAN or other mechanisms for communicating via a network, such as network 150 or another network via which communication device 110 communicates with other devices/systems.

The exemplary configuration illustrated in FIG. 2 is provided for simplicity. It should be understood that communication device 110, service provider 130 and/or user device 140 may include more or fewer devices than illustrated in FIG. 2. For example, various modulating, demodulating, coding and/or decoding components, one or more power supplies or other components may be included in one or more of communication device 110, output device 120, service provider 130 and user device 140.

Communication device 110 may perform processing associated with interacting with output device 120, user device 140 and other devices in network 100. For example, communication device 110 may perform processing associated with receiving commands from a user via, for example, user device 140. The information provided by the user may include instructions for viewing programming provided by service provider 130, such as programming that was broadcast or aired at an earlier time. Communication device 110 may perform these operations in response to processor 220 executing sequences of instructions contained in a computer-readable medium, such as memory 230. A computer-readable medium may be defined as a physical or logical memory device. The software instructions may be read into memory 230 from another computer-readable medium (e.g., a hard disk drive (HDD), SSD, etc.), or from another device via communication interface 260. Alternatively, hard-wired circuitry may be used in place of or in combination with software instructions to implement processes consistent with the implementations described herein. Thus, implementations described herein are not limited to any specific combination of hardware circuitry and software.

Figure 3:
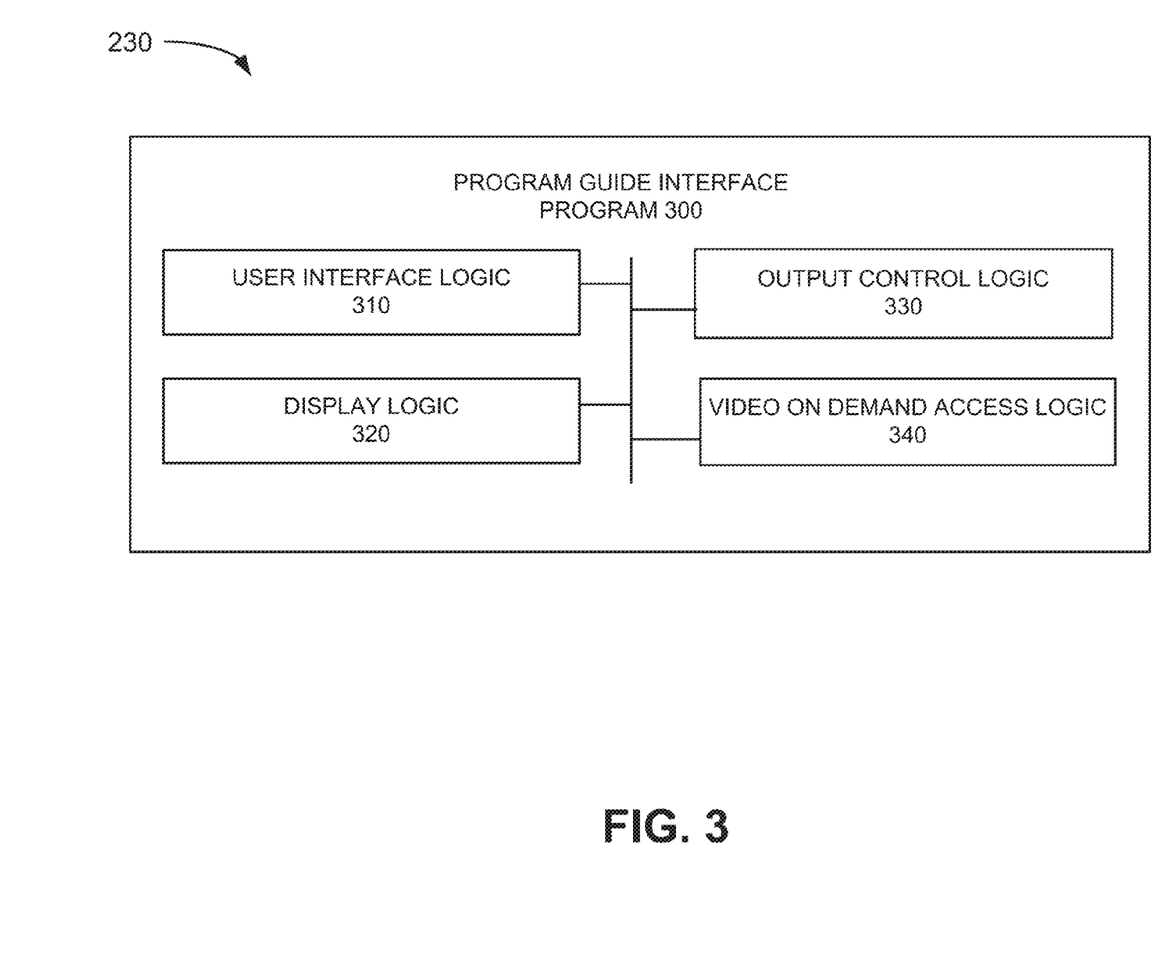
FIG. 3 illustrates an exemplary configuration of logic components implemented in the communication device of FIG. 2.

FIG. 3 is an exemplary functional block diagram of components implemented in communication device 110 of FIG. 2. In an exemplary implementation, all or some of the components illustrated in FIG. 3 may be stored in memory 230. For example, referring to FIG. 3, memory 230 may include program guide interface program 300.

Program guide interface program 300 may include a software program executed by processor 220 that allows communication device 110 to communicate with wired and wireless devices, such as user device 140. In an exemplary implementation, program guide interface program 300 may include user interface logic 310, display logic 320, output control logic 330 and video on demand (VOD) access logic 340. Program guide interface program 300 and its various logic components are shown in FIG. 3 as being included in communication device 110. In alternative implementations, these components or a portion of these components may be located externally with respect to communication device 110. For example, in some implementations, one or more of the components of program guide interface program 300 may be located in or executed by output device 120 or another device located externally from communication device 110, such as service provider 130.

User interface logic 310 may include logic to provide a user with an interface to select a program to view. For example, user interface logic 310 may provide a graphical user interface (GUI) that allows a user to view programs that are currently being broadcast, as well as programs to be broadcast in the future. The GUI may also allow the user to go back in time and view listings for programs that were previously broadcast by service provider 130, but that are still available for viewing, as described in detail below.

Display logic 320 may include logic for displaying programs available for viewing. For example, display logic 320 may output an electronic program guide that displays information, such as the name, channel number, duration, etc., of programs that are currently being broadcast, as well as programs that will be broadcast in the future. In an exemplary implementation, display logic 320 may output, via the electronic program guide, information associated with television programs that have already been broadcast, but that are still available to be viewed. In addition, in some implementations, programs that were previously broadcast may be shown in a manner that allows a viewer to know whether a program is available for viewing. For example, a listing associated with a program that was originally broadcast at a previous time may be shown in the electronic program guide in its normal style (e.g., color, font, size, etc.), whereas a listing associated with a program that is no longer available for viewing may be shown in a different style (e.g., lighter color, smaller size), or not shown at all (e.g., a cell/box corresponding to the program listing is grayed out or blacked out), as described in more detail below.

Output control logic 330 may include logic to output programming (e.g., television shows, movies, sporting events) provided to communication device 110. For example, output control logic 330 may output programming provided by service provider 130 to output device 120 based on user commands provided via user interface logic 310.

VOD access logic 340 may include logic to access programming provided by service provider 130 at any time via an on demand library. For example, VOD access logic 340 may access programming broadcast at a particular time that has passed, but that is still available to be viewed via an on demand mode. In one implementation, a user may select a program that was broadcast at an earlier time, but that is displayed via the electronic program guide. In this implementation, VOD access logic 340 may request that service provider 130 provide the selected program in an on demand manner, as described in more detail below.

Communication device 110, as described above, may receive programming from service provider 130 for display via output device 120. Communication device 110 may also provide a program guide that includes programs that were previously broadcast by service provider 130, but are still available for viewing, as described in detail below.

Figure 4:
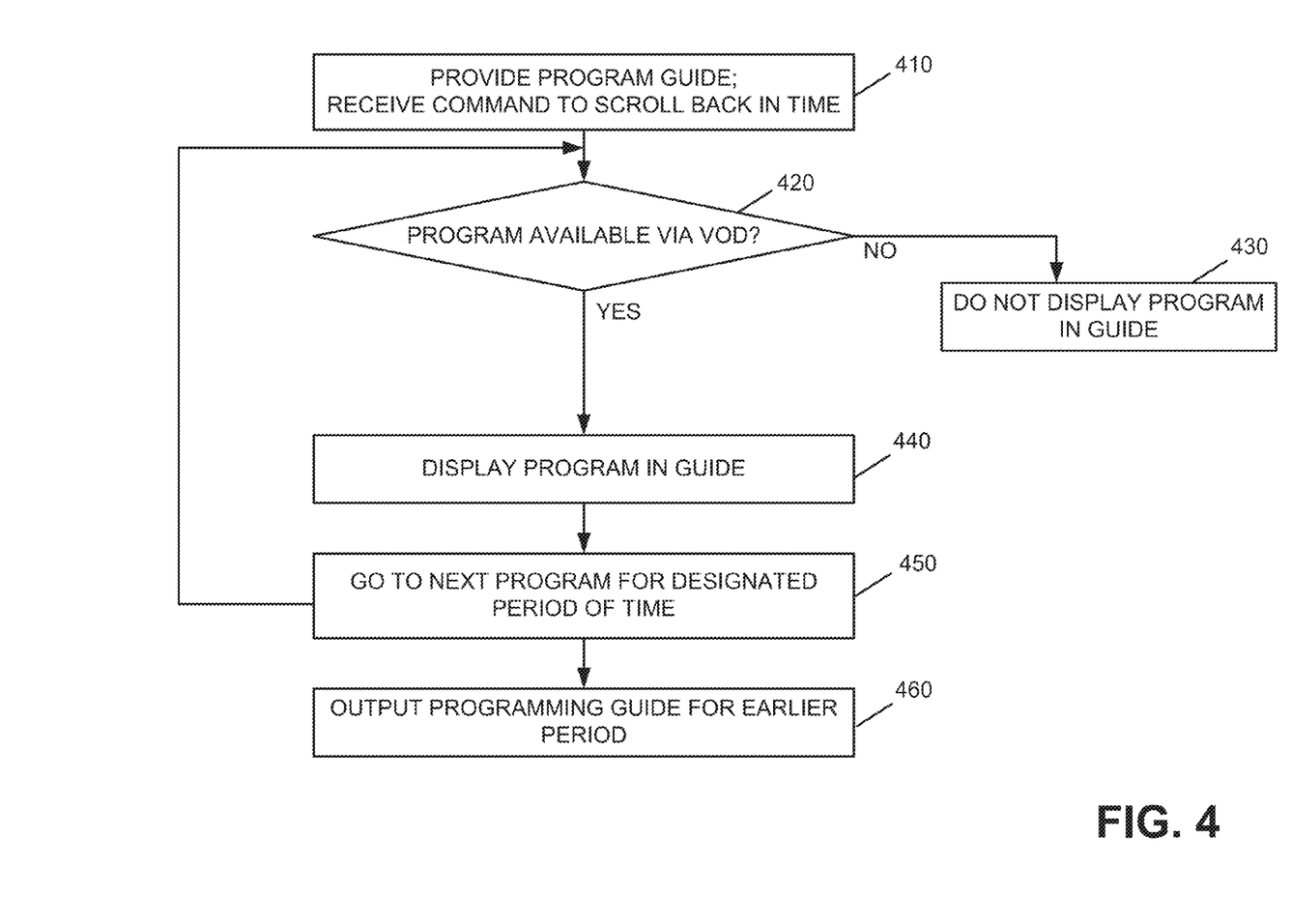
FIG. 4 is a flow diagram illustrating exemplary processing by various devices illustrated in FIG. 1.

FIG. 4 is a flow diagram illustrating exemplary processing associated with a user interacting with communication device 110 to view programs. In this example, assume that user device 140 is a remote control device associated with controlling communication device 110 and/or output device 120. Processing may begin with a user of user device 140 coming into relatively close proximity with communication device 110. For example, assume that a user of user device 140 is watching television provided on output device 120 and decides that he/she would like to access the program guide provided by service provider 130. In this case, the user may press "program guide" on user device 140 and user interface logic 310 may provide an electronic program guide on output device 120 (block 410). Further assume that the user would like to scroll back in time to view programs that were previously broadcast by service provider 130 via communication device 110. In one implementation, the user of user device 140 may select/press a button on user device 140 having an arrow facing in the left direction or press/select another button on user device 140, such as a button labeled "scroll back," to scroll back in time to view programs that were previously broadcast (block 410). For example, if the current time is 9:00 PM, the user may press a left direction facing or back arrow/button on user device 140 to view programs broadcast during the period from 7:30 PM-9:00 PM.

Display logic 320 may determine whether the programs broadcast at the earlier time period are available for viewing (block 420). For example, display logic 320 may identify programs for the designated time period that are available for viewing at any time via the on demand service provided by service provider 130. In this case, display logic 320 may access a VOD library stored at communication device 110 and/or service provider 130 to determine whether the programs from the time period of 7:30 PM to 9:00 PM are available via the VOD library.

If a particular program, such as the local news broadcast at 7:30 PM on a particular channel, is not available via the VOD library/system (block 420—no), display logic 320 may not display a listing for that particular program in the program guide when the earlier time period is displayed (block 430). Alternatively, display logic 320 may display the program listing in a different manner than that for programs available for viewing, such as using a lighter font, smaller size, different color, etc., so that the viewer knows that the program is not available for viewing.

If a particular program is available via VOD (block 420—yes), display logic 320 may display that program listing in the program guide (block 440). For example, display logic 320 may display the program listing in a normal manner such that the viewer will know that the program is available for viewing. In some implementations, the program guide may also be annotated with information, such as text, an icon and/or a symbol located adjacent the program listing or in the box/cell associated with the program listing. The annotation may indicate that the program can be currently viewed. For example, the text may include a "watch now" and/or "VOD program" label located in the box/cell with the program listing.

Processing may continue in this manner for the next program in the designated earlier period of time (block 450) until all the programs in the selected block of time are processed. In an exemplary implementation, when the user selects to scroll back in time in the program guide, display logic 320 may display programs for the channel the viewer is currently watching and for a number of channels located adjacent (in number) to the current channel. For example, if the user is viewing Channel 5, the program guide may display programs on Channel 5, in addition to programs on Channel 4, Channel 7 and Channel 9. In this manner, program guide interface program 300 may process the program information for the earlier period of time in an efficient manner. That is, program guide interface program 300 may process only those programs/listings that will be displayed to the user. If the user wants to scroll to other channels in the guide, or scroll to even earlier periods of time (e.g., up to 24 hours or more prior to the current time), program guide interface program 300 may process the earlier broadcast programs for those channels and those time periods in the manner described above with respect to FIG. 4. In other words, programs that are available via the on demand mode will be displayed to the user in a manner that allows the user to ascertain that the programs are available for viewing.

In each case, after the programs on the appropriate channels for the earlier period of time are processed to determine if the programs are available for current viewing, output control logic 330 may output the program guide via output device 120 (block 460).

Figure 5:
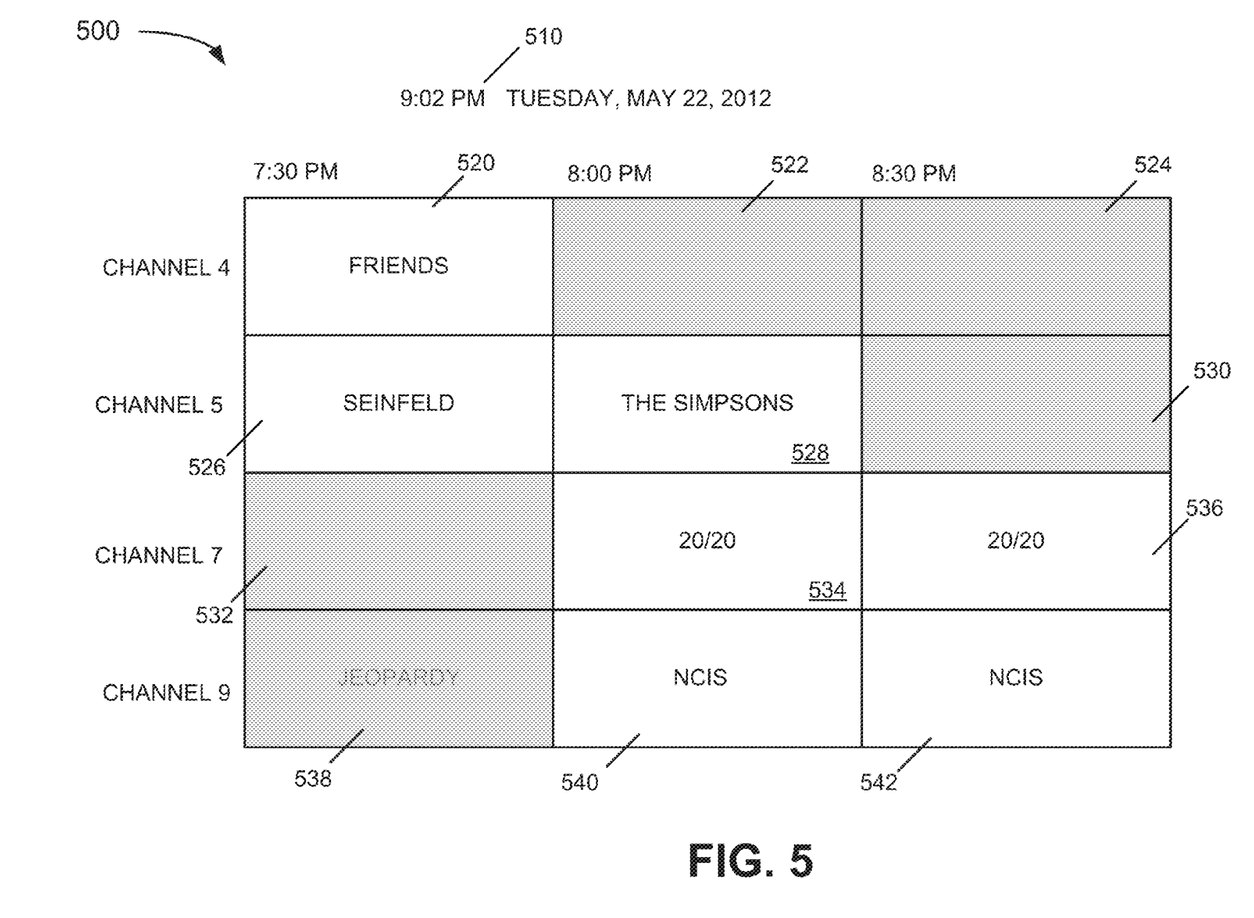
FIG. 5 is an exemplary user interface screen provided by the logic components illustrated in FIG. 3.

For example, FIG. 5 illustrates an exemplary program guide 500 output by program guide interface program 300. In this example, assume that the day is Tuesday May 22, 2012 and the current time is 9:02 PM, as indicated in area 510 of FIG. 5. Program guide 500 includes listing for Channels 4, 5, 7 and 9 for the period from 7:30 PM through 9:00 PM. As illustrated in FIG. 5, boxes 520, 522 and 524 (also referred to as cells 520, 522 and 524) correspond to a half hour time slots on Channel 4 from 7:30-8:00 PM, 8:00-8:30 PM and 8:30-9:00 PM, respectively. Cell 520 displays the title/listing "Friends" and cells 522 and 524 are shown "grayed out" with no title information. In this implementation, the episode of the TV show "Friends" that originally was broadcast/aired at 7:30 PM is available for viewing, whereas the programs originally broadcast at 8:00 PM and 8:30 PM on Channel 4 are not available for viewing. For example, cell 520 displays the title/listing for Friends in a similar manner as those listings in the program guide for shows that are currently being broadcast or shows that will be broadcast in the future. In this manner, the user may easily ascertain that the show listed in cell 520 is available for viewing.

Similarly, program listings provided in cells 526 and 528 on Channel 5, program listings provided in cells 534 and 536 on Channel 7 and program listings provided in cells 540 and 542 on Channel 9 are available for viewing. In addition, the program originally broadcast from 8:30-9:00 PM on Channel 5, the program originally broadcast from 7:30-8:00 PM on Channel 7 and the program originally broadcast from 7:30-8:00 PM on Channel 9 are not available for viewing, as indicated by the grayed out cells 530, 532 and 538, respectively. In some implementations, cells shown as being grayed out may also list the program originally broadcast during that time period. For example, cell 538 displays the program name "Jeopardy" in a lighter/different font, different size, different color, etc., than shows that are available for viewing. In this manner, the viewer may become aware of the show that was broadcast during the earlier time, but also be aware that the program is not available for viewing. In each case, program guide interface program 300 may link the program guide to the VOD system/library provided by service provider 130. The user may select one of the programs available via the VOD library and displayed on the program guide for viewing, as described below.

Figure 6:
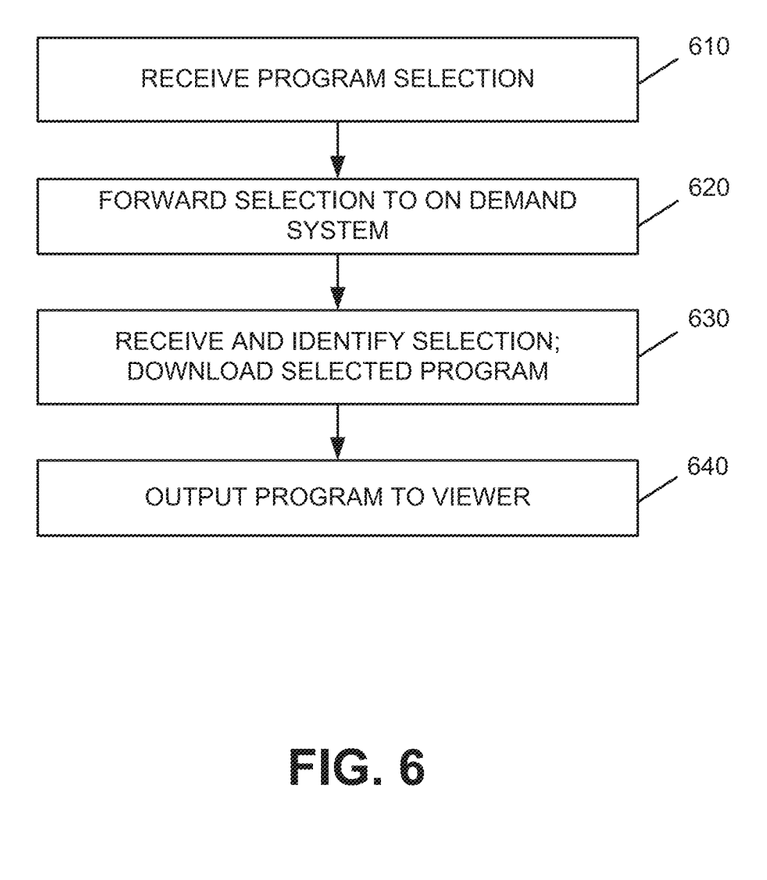
FIG. 6 illustrates exemplary processing associated with viewing programs displayed on a program guide.

FIG. 6 illustrates exemplary processing associated with viewing programming that was broadcast at an earlier time. Processing may begin with the viewer accessing the program guide associated with an earlier period of time, as described above with respect to FIGS. 4 and 5. For example, assume that the current time is 9:02 PM and the viewer is accessing program guide 500 illustrated in FIG. 5. Further assume that the viewer would like to view an episode of Friends that was broadcast at 7:30 PM on Channel 4. The viewer may navigate, via controls on user device 140, to cell 520. The user may then select/enter "OK" on user device 140 when cell 520 has been selected/highlighted. User interface logic 310 receives the selection (block 610).

Since the program listed in cell 520 is available via the on demand mode, VOD access logic 340 forwards the selection to the VOD system/library at service provider 130 (block 620). Service provider 130 receives the selection and identifies the requested program (block 630). Service provider 130 may then download the selected program from the VOD system to communication device 110 (block 630). Communication device 110 receives the program and output control logic 330 outputs the selected program to output device 120 for viewing by the user (block 640).

In this manner, the viewer can watch a program that was originally broadcast at an earlier time without having to access a VOD interface available via communication device 110. That is, program guide interface program 300 may provide all links from the program guide to the VOD system based on a single selection from the user on the program guide. This may allow the user to save considerable time with respect to viewing a program by avoiding accessing the VOD interface and searching for a program via the VOD interface, which may include a number of menus/sub-menus or screens that the user must navigate to find the program of interest. This may be particularly useful when the user knows that a program of interest has been recently broadcast and may allow the user to view the program in a manner similar to that for a live program.

In addition, in some implementations, the user may also record a program that was previously broadcast. In this case, the viewer may select a "record" button/selection on user device 140 when the particular program of interest is selected and/or highlighted via the program guide. For example, if the user would like to record an episode of NCIS broadcast on Channel 9 at 8:00 PM, the user may navigate to cell 540 in program guide 500 and then select/enter the record button on user device 140. In this manner, electronic program guide 500 may facilitate recording of programs that were broadcast during earlier periods of time. The user, at a later time, may then access his/her list of recorded programs via a DVR button on user device 140, select the program of interest and watch the program. This may allow the user to more easily watch programs at a later time without accessing a VOD interface/menu. In addition, since the program of interest has been recorded, all remote control features, such as fast forward, rewind, etc., may be available to the user when watching the program, as opposed to watching programs in an on demand mode in which some user controls may not be available to the user.

As described above, a viewer may navigate within an electronic program guide to earlier periods of time to view programs that were previously broadcast. This may also allow the user to avoid missing the beginning of a program. For example, assume that the user has turned on communication device 110 (e.g., a STB) and output device 120 (e.g., a television) and has begun to watch a program, such as a movie, that has already started. In this case, the user may access the program guide and navigate back in time to determine whether the program is available from the start. For example, assume that the current time is 10:00 PM and the movie started at 9:00 PM. The user may access the program guide and scroll back with the left arrow or another button and view the program guide for the period from, for example, 8:00 PM-10:00 PM. If the listing for the movie that the user is currently viewing is shown on the program guide, the user may navigate via user device 140 to the program listing displayed in the period of time when the movie began (i.e., 9:00 PM in this example), select the listing and begin viewing the movie from the start.

As described above, program guide interface program 300 may be used to allow a user to view programs that have already been broadcast by service provider 130. In some implementations, program guide interface program 300 may also allow the user to select one or more programs from a series of programs that have already been broadcast/aired. For example, assume that the user would like to watch an episode of NCIS broadcast at 8:00 PM on Tuesday May 22, 2012. In this case, the user may navigate to cell 540 in program guide 500 (FIG. 5) and then select/enter "OK" or "watch" on user device 140. In this implementation, user interface logic 310 may provide a GUI that allows the user to select from a number of different broadcasts of the television series NCIS.

Figure 7A:
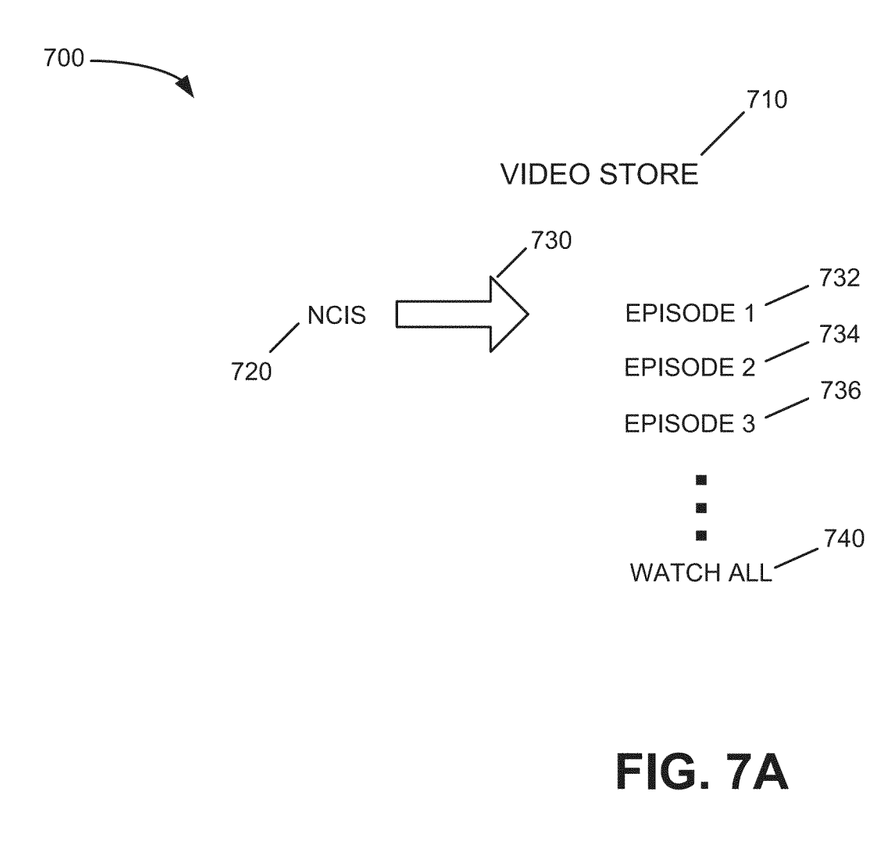
FIGS. 7A and 7B illustrate exemplary user interfaces provided by the logic components illustrated in FIG. 3.

For example, user interface logic 310 may output user interface 700 illustrated in FIG. 7A. Referring to FIG. 7A, user interface 700 may include a label/title "Video Store" at area 710 and label 720 identifying the selected program (i.e., NCIS in this example). User interface 700 may also include arrow 730 pointing to a number of selections associated with different episodes of the series, such as Episode 1, Episode 2, Episode 3, etc., labeled 732, 734 and 736. The selections may also include a "Watch All" selection, labeled 740. The user may then select to watch a particular episode of the series by selecting the particular episode of interest. For example, the user may select episode 3 by navigating to that item and pressing "OK" or "view" on user device 140. Alternatively, if the user would like to view all of the episodes in the current season of the show, the user may navigate to the "watch all" selection, labeled 740, and select OK/view. In this case, communication device 110 may send the selection to service provider 130 and service provider 130 may provide all of the programs associated with the series in a sequential manner so that the user can view all the programs of interest. In each case, communication device 110 may output the selected show(s) via output device 120 for viewing.

Figure 7B:
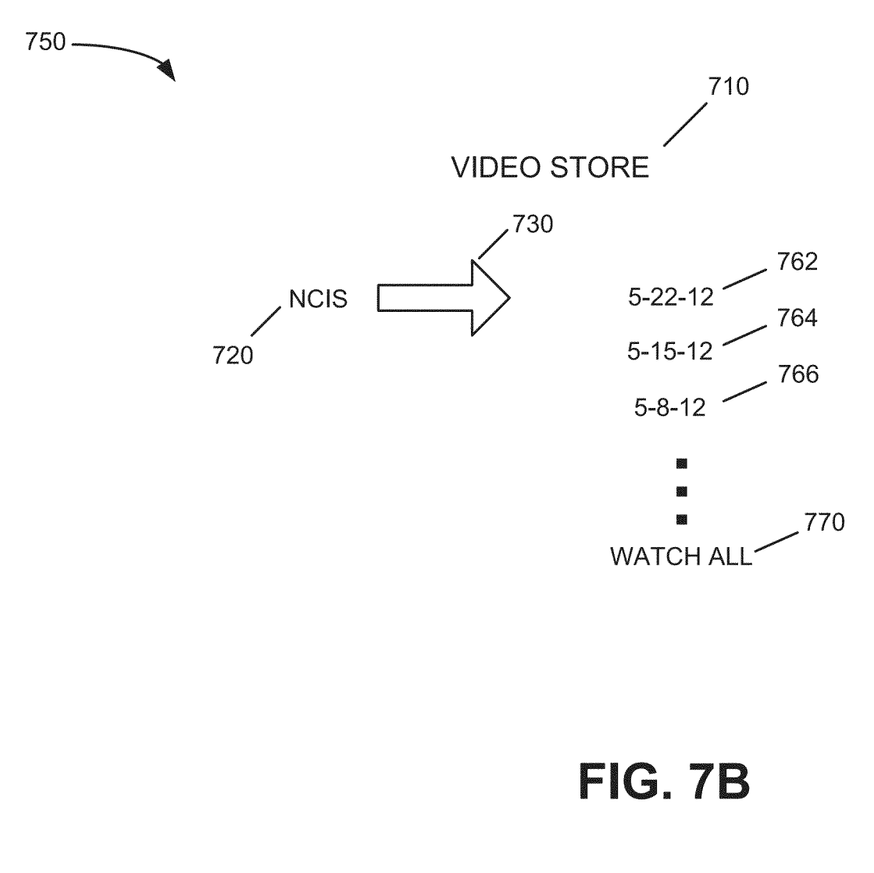

In another implementations, user interface logic 310 may output user interface 750 illustrated in FIG. 7B. Referring to FIG. 7B, user interface 750 may include the "Video Store" label at area 710, the selected program (i.e., NCIS in this example), labeled 720 and arrow 730 pointing to a number of selections associated with different episodes of the series, such as the episode that was originally broadcast on May 22, 2012, an episode broadcast on May 15, 2012, and an episode broadcast on May 8, 2012, labeled 762, 764 and 766, respectively. The selections may also include a "Watch All" selection, labeled 770. The user may then select a particular episode of the series by selecting the particular episode of interest. For example, the user may wish to watch the most recent episode that aired on May 22, 2012. In this case, the user may navigate to the listing 5-22-12, labeled 762, and press "OK" or "view" on user device 140. Alternatively, if the user would like to view all of the episodes in this season of the show, the user may navigate to "watch all" at area 770 and select OK/watch. In each case, communication device 110 may send the selection to service provider 130 and service provider 130 may provide the program or programs that were selected. Communication device 110 may then output the show(s) via output device 120 for viewing.

Implementations described herein allow a user to scroll back in time via a program guide to view programs listings associated with programs that were previously broadcast, but that are still available for viewing. The user may then select one of the programs and view the program of interest. This may allow the user to more easily view programs of interest.

The foregoing description of exemplary implementations provides illustration and description, but is not intended to be exhaustive or to limit the embodiments to the precise form disclosed. Modifications and variations are possible in light of the above teachings or may be acquired from practice of the embodiments.

For example, in the implementations described above, a television service provider was described as providing television programming to users. In other implementations, a service provider may provide any type of information to viewers, such as video pod casts, streaming media presentations, etc. In each case, the service provider may allow the user to view programs previously provided, but that are still available for viewing via an on demand system or similar system that stores information/programs for viewing.

Further, implementations described above refer to allowing the user to view programs previously broadcast by linking the program guide to an on demand accessible system/programs. In some implementations, programs that will be broadcast in the future may also be linked to the on demand system. In such implementations, the user accesses the program guide and scrolls forward in time to view programs that will be broadcast in the future. The user may select a program listing associated with a program that will be broadcast in the future (whose listing may be annotated with text, such as "VOD program," "watch now," or an icon/symbol that allows the user to know that the program is available) and if the program is available via the VOD library/system, communication device 110 may request the program from service provider 130. The user may then begin viewing the program prior to the scheduled broadcast time. In other implementations, service provider 130 may allow the user to preview a portion of the program that will be broadcast in the future, such as view a short snippet or preview/highlights of the program of interest, as opposed to viewing the entire program before its scheduled broadcast time.

Still further, implementations described above refer to use directional arrows or scroll buttons to scroll a program guide to earlier periods of time. In some implementations, user interface logic 310 of program guide interface program 300 may allow the user to launch a search query to search for a particular program in the program guide that may have been previously broadcast. In such implementations, a user may launch a search of the program guide by selecting an appropriate button/key on user device 140 to search for a program of interest. Program guide interface program 300 may receive the search query and search for the program during earlier periods of time to attempt to locate the program of interest. If the program of interest has been previously broadcast and is available via the VOD library/system, display logic 320 may display the earlier portion of the program guide identifying the program of interest that was previously broadcast. The user may then elect to watch the program of interest by selecting "OK" or "view now" via user device 140.

In addition, while series of acts have been described with respect to FIGS. 4 and 6, the order of the acts may be varied in other implementations. Moreover, non-dependent acts may be implemented in parallel.

It will be apparent that various features described above may be implemented in many different forms of software, firmware, and hardware in the implementations illustrated in the figures. The actual software code or specialized control hardware used to implement the various features is not limiting. Thus, the operation and behavior of the features were described without reference to the specific software code—it being understood that one of ordinary skill in the art would be able to design software and control hardware to implement the various features based on the description herein.

Further, certain portions of the invention may be implemented as "logic" that performs one or more functions. This logic may include hardware, such as one or more processors, microprocessor, application specific integrated circuits, field programmable gate arrays or other processing logic, software, or a combination of hardware and software.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

What is claimed is:

1. A method, comprising:
    receiving, at a set top box, an instruction or command from a user to scroll back in time in a program guide to view program listings associated with television programs that were broadcast by a television service provider during a first period of time that is prior to a current time;
    identifying at least two television programs that were broadcast during the first period of time, that were not previously recorded by the user and that are available to the user;
    outputting, by the set top box, the program guide associated with the first period of time, the program guide identifying the at least two television programs that were broadcast during the first period of time, that were not previously recorded by the user and that are available to the user;
    receiving, at the set top box, a selection corresponding to a first one of the at least two television programs;
    automatically outputting, by the set top box and without further input from the user, the first television program, in response to the selection;
    receiving, at the set top box, a second selection corresponding to a second one of the at least two television programs that were broadcast during the first period of time, wherein the second television program is associated with a series of programs;
    providing, in response to the second selection, an option for the user to select from a plurality of programs in the series of programs and a second option for the user to select to watch all of the programs in the series of programs;
    receiving, at the set top box, a third selection to view a third one of the plurality of programs in the series;
    receiving, by the set top box, the third program in the series;
    automatically outputting, by the set top box and without further input from the user, the third program in response to the third selection;
    receiving, at the set top box, a second instruction or command from the user to view program listings associated with programs that are to be broadcast in the future by the television service provider;
    identifying a fourth program that is scheduled to be broadcast in the future and that is available to the user for viewing;
    outputting, by the set top box, the program guide identifying the fourth program;
    receiving, at the set top box, a fourth selection corresponding to the fourth program;
    forwarding the fourth selection to the television service provider;
    receiving, at the set top box, the fourth program from the television service provider, in response to the fourth selection; and
    outputting, by the set top box and without further input from the user, all of the fourth program prior to the scheduled broadcast.

2. The method of claim 1, further comprising:
    forwarding, by the set top box, information identifying the first television program to the television service provider, in response to receiving the selection; and
    receiving, from the television service provider, the first television program.

3. The method of claim 1, further comprising:
    identifying a plurality of television programs that were broadcast during the first period of time and that are not available to the user; and
    displaying, in the program guide, information identifying the plurality of television programs that were broadcast during the first period of time and that are not available to the user in a smaller size than television programs that were broadcast during the first period of time and that are available to the user.

4. The method of claim 1, further comprising:
    providing at least one of an icon, a symbol or text with a program guide listing associated with the first television program, wherein the icon, symbol or text indicates that the first television program is available for viewing.

5. The method of claim 1, wherein outputting the program guide further comprises:
    providing no information or graying out cells of the program guide corresponding to television programs that are not available for viewing.

6. The method of claim 1, wherein the identifying at least two television programs that were broadcast during the first period of time and that are available to the user comprises:
    accessing an on demand database listing television programs available for viewing, and
    identifying a plurality of television programs broadcast during the first period of time that are available for viewing at any time by the user, based on information stored in the on demand database.

7. The method of claim 1, wherein the receiving an instruction or command comprises:
    receiving, via a remote control device, an input associated with at least one of an arrow facing a left direction or a scroll back in time button.

8. The method of claim 1, further comprising:
    receiving, at the set top box, a fifth selection selecting the second option to watch all of the plurality of programs in the series;
    receiving, by the set top box, the plurality of programs in the series; and
    outputting, by the set top box, the plurality of programs in a sequential manner, in response to receiving the plurality of programs.

9. The method of claim 1, further comprising:
    identifying at least a fifth program that is scheduled to be broadcast in the future;
    outputting, by the set top box, the program guide identifying the fifth program;
    receiving, at the set top box, a fifth selection corresponding to the fifth program;
    forwarding the fifth selection to the television service provider;
    receiving, at the set top box, a snippet of the fifth program from the television service provider; and
    outputting, by the set top box, only the snippet of the fifth program prior to the scheduled broadcast.

10. The method of claim 1, further comprising:

receiving, at the set top box, a search query from the user;

identifying, in response to the search query, a fifth television program that was broadcast during the first period of time and that is available for viewing via a video on demand system;

outputting a portion of the program guide corresponding to the first period of time, the portion of the program guide identifying the fifth television program;

receiving, from the user, a fifth selection corresponding to the fifth television program; and outputting, by the set top box, the fifth television program.

11. A device, comprising:

a communication interface configured to receive programming from a service provider; and logic configured to:

receive an instruction or command from a user to view program listings associated with programs that were broadcast by the service provider during a first period of time that is prior to a current time, identify at least two programs that were broadcast during the first period of time and that are available to the user for viewing, output a program guide identifying the at least two programs that were broadcast during the first period of time, that were not previously recorded by the user and that are available to the user for viewing, receive a selection, from the user, corresponding to a first one of the at least two programs, forward the selection to the service provider, receive the first program from the service provider, automatically output the first program to an output device for viewing, in response to receiving the first program, receive a second selection corresponding to a second one of the at least two programs that were broadcast during the first period of time, wherein the second program is associated with a series of programs, output an interface screen providing an option for the user to select from a plurality of programs in the series and a second option for the user to select to watch all of the programs in the series of programs, receive a third selection, from the user, to view a third one of the plurality of programs in the series, receive, from the service provider, the third program in the series, automatically output the third program in response to the third selection, receive a second instruction or command from the user to view program listings associated with programs that are to be broadcast in the future by the service provider, identify a fourth program that is scheduled to be broadcast in the future and that is available to the user for viewing, output the program guide identifying the fourth program, receive a fourth selection corresponding to the fourth program, forward the fourth selection to the service provider, receive the fourth program from the service provider, in response to the fourth selection, and automatically output the fourth program to the output device for viewing, in response to receiving the fourth program and prior to the scheduled broadcast.

12. The device of claim 11, wherein the logic is further configured to:

identify a plurality of programs that were broadcast during the first period of time and that are not available to the user for viewing, and displaying, in the program guide, listings associated with the plurality of programs that were broadcast during the first period of time and that are not available to the user for viewing in a smaller size than programs that were broadcast during the first period of time and that are available to the user.

13. The device of claim 11, wherein the logic is further configured to:

provide at least one of an icon, a symbol or text with a program guide listing associated with the first program, wherein the icon, symbol or text indicates that the first program is available for viewing.

14. The device of claim 11, wherein when outputting the program guide, the logic is configured to:

provide no information or gray out cells of the program guide corresponding to programs that are not available for viewing.

15. The device of claim 11, wherein when identifying at least two programs that were broadcast during the first period of time and that are available to the user, the logic is configured to:

access a database listing programs associated with an on demand system that are available for viewing, and identify a plurality of programs broadcast during the first period of time and that are available for viewing based on information stored in the database.

16. The device of claim 11, wherein the logic is further configured to:

receive a fifth selection selecting the second option, from the user, to watch all of the plurality of programs in the series, receive, from the service provider, the plurality of programs in the series, and output the plurality of programs to the output device in a sequential manner, in response to receiving the plurality of programs.

17. The device of claim 11, wherein the device comprises a set top box or a television.

18. The device of claim 11, wherein the logic is further configured to:

identify a fifth program that is scheduled to be broadcast in the future and that is available to the user for viewing, output the program guide identifying the fifth program, receive a fifth selection corresponding to the fifth program, forward the fifth selection to the service provider, receive a snippet of the fifth program from the service provider, and output only the snippet of the fifth program to the output device prior to the scheduled broadcast.

19. A non-transitory computer-readable medium having stored thereon sequences of instructions which, when executed by at least one processor, cause the at least one processor to:

receive an instruction or command from a user to view program listings associated with programs that were previously broadcast by a service provider;

identify at least two programs that were previously broadcast during a first period of time, that were not previously recorded by the user and that are available to the user for viewing;

output a program guide identifying the at least two programs that were broadcast during the first period of time, that were not previously recorded by the user and that are available to the user for viewing;

receive a selection, from the user, via the program guide corresponding to a first one of the at least two programs;

forward the selection to the service provider;

receive the first program from the service provider;

automatically output, without receiving further input from the user, the first program to an output device for viewing, in response to receiving the first program;

receive a second selection, from the user, via the program guide corresponding to a second one of the at least two programs, wherein the second program is associated with a series of programs;

provide, in response to the second selection, a first option for the user to select from a plurality of programs in the series of programs and a second option for the user to select to watch all of the programs in the series of programs;

receive a second instruction or command from the user to view program listings associated with programs that are to be broadcast in the future by the service provider;

identify at least a third program that is scheduled to be broadcast in the future and that is available to the user for viewing;

output the program guide identifying the third program;

receive a third selection via the program guide corresponding to the third program;

forward the third selection to the service provider;

receive the third program from the service provider; and output, without receiving further input from the user, the entire third program to the output device in response to receiving the third program prior to the scheduled broadcast.

20. The non-transitory computer-readable medium of claim 19, further including instructions for causing the at least one processor to:

identify a plurality of programs that were previously broadcast during the first period of time and that are not available to the user for viewing; and not include, with the program guide, listings associated with the plurality of programs that were previously broadcast during the first period of time and that are not available to the user for viewing.

21. The non-transitory computer-readable medium of claim 19, wherein when outputting the program guide, the instructions cause the at least one processor to:

provide at least one of an icon, a symbol or text with a program guide listing associated with the first program, wherein the icon, symbol or text indicates that the first program is available for viewing, and provide no information or gray out cells of the program guide corresponding to programs that are not available for viewing.

* * * * *